US008797898B2

(12) United States Patent
Kim et al.

(10) Patent No.: US 8,797,898 B2
(45) Date of Patent: Aug. 5, 2014

(54) OPEN WIRELESS ACCESS NETWORK APPARATUS AND CONNECTION METHOD USING THE SAME

(75) Inventors: Tae-Yeon Kim, Daejeon-si (KR); Ho-Young Song, Daejeon-si (KR)

(73) Assignee: Electronics and Telecommunications Research Institute, Daejeon-si (KR)

( * ) Notice: Subject to any disclaimer, the term of this patent is extended or adjusted under 35 U.S.C. 154(b) by 246 days.

(21) Appl. No.: 13/333,544

(22) Filed: Dec. 21, 2011

(65) Prior Publication Data

US 2012/0163215 A1 Jun. 28, 2012

(30) Foreign Application Priority Data

Dec. 23, 2010 (KR) ........................ 10-2010-0133808

(51) Int. Cl.
| | |
|---|---|
| *H01R 31/08* | (2006.01) |
| *H04W 8/26* | (2009.01) |
| *H04L 29/06* | (2006.01) |
| *H04L 12/24* | (2006.01) |

(52) U.S. Cl.
CPC ............. *H04W 8/26* (2013.01); *H04L 41/5067* (2013.01); *H04L 63/08* (2013.01)
USPC ........................................................ 370/252

(58) Field of Classification Search
CPC ............ H04W 72/1236; H04W 72/02; H04W 36/0055
See application file for complete search history.

(56) References Cited

U.S. PATENT DOCUMENTS

| | | | |
|---|---|---|---|
| 2004/0246958 A1 | 12/2004 | Lee et al. | |
| 2006/0045075 A1 | 3/2006 | Jiang et al. | |
| 2006/0126613 A1* | 6/2006 | Zweig | 370/389 |
| 2008/0019319 A1* | 1/2008 | Bahini et al. | 370/331 |
| 2008/0186925 A1* | 8/2008 | Cheng et al. | 370/338 |
| 2010/0229225 A1* | 9/2010 | Sarmah et al. | 726/6 |
| 2011/0142212 A1* | 6/2011 | Kim et al. | 379/93.02 |
| 2012/0066767 A1* | 3/2012 | Vimpari | 726/26 |

FOREIGN PATENT DOCUMENTS

| | | |
|---|---|---|
| KR | 10-0356959 | 10/2002 |
| KR | 10-0580169 | 5/2006 |
| KR | 1020100091590 | 8/2010 |

* cited by examiner

*Primary Examiner* — John Blanton
(74) *Attorney, Agent, or Firm* — Nelson Mullins Riley & Scarborough LLP; Anthony A. Laurentano, Esq.

(57) ABSTRACT

An open wireless access network apparatus includes an Internet protocol (IP) resource management unit to allocate IPs, respectively, to a plurality of provider servers and open wireless access points (APs), and map the IP of each provider server to the IP of each open wireless AP; a subscriber movement management unit to provide a second wireless AP with an IP that has been allocated to a first wireless AP when a mobile device changes from one area in which the mobile device has a signal delivered from the first wireless AP to another area in which the mobile device has a signal delivered from the second wireless AP; and a wireless AP connection control unit to allow the mobile device to be connected to the second wireless AP through the allocated IP.

14 Claims, 6 Drawing Sheets

OPEN WIRELESS ACCESS NETWORK APPARATUS AND CONNECTION METHOD USING THE SAME

CROSS-REFERENCE TO RELATED APPLICATION(S)

This application claims the benefit under 35 U.S.C. §119(a) of Korean Patent Application No. 10-2010-0133808, filed on Dec. 23, 2010, in the Korean Intellectual Property Office, the entire disclosure of which is incorporated herein by reference for all purposes.

BACKGROUND

1. Field

The following description relates to an open wireless access network apparatus and a connection method using the same, and more particularly, to an open wireless access network apparatus that ensures seamless service and a method using the open wireless access network apparatus.

2. Description of the Related Art

Mobile devices such as notebook computers, smart phones, and the like are widely used, and such mobile devices use Wi-Fi network to access wireless Internet.

Wi-Fi is abbreviation for wireless fidelity, represents wireless Internet (wireless LAN) technique that allows high-performance wireless communication, and refers to standards made by Institute of Electrical and Electronics Engineers (IEEE).

Wireless devices are connected to a wireless access point (AP) through a wireless LAN and the wireless AP accesses an Internet network through a switch or a router for the Internet connection.

With the wide distribution of mobile devices, user of wireless Internet and wireless APs are increasing, and network deterioration consequently occurs, which causes service quality degradation.

In addition, when a mobile device attempts to access wireless Internet through a wireless AP, it is not possible to identify wireless Internet service providers and when a location of the mobile device is changed, the mobile device's user may have to be provided with the wireless Internet service from a different wireless Internet service provider.

As described above, in a case where the wireless Internet service provider is changed from one to another during use of the service, the provision of seamless service cannot be achieved due to subscriber authentication procedures and address regions which differ from one Internet service provider to another.

SUMMARY

In one general aspect, there is provided an open wireless access network apparatus including: an Internet protocol (IP) resource management unit configured to allocate IPs, respectively, to a plurality of provider servers and open wireless access points (APs), and map the IP of each provider server to the IP of each open wireless AP; a subscriber movement management unit configured to provide a second wireless AP with an IP that has been allocated to a first wireless AP when a mobile device changes from one area in which the mobile device has a signal delivered from the first wireless AP to another area in which the mobile device has a signal delivered from the second wireless AP; and a wireless AP connection control unit configured to allow the mobile device to be connected to the second wireless AP through the allocated IP.

The open wireless access network apparatus may further include a provider authentication unit configured to be connected to the IP resource management unit to authenticate a plurality of the provider servers such that each of the provider servers individually proceeds with authentication.

The open wireless access network apparatus may further include a provider connection control unit configured to be connected to the IP resource management unit to manage connection of each of the provider servers.

The open wireless access network apparatus may further include a subscriber authentication management unit configured to be connected to the subscriber movement management unit and authenticate the subscriber based on information about a subscriber that uses an Internet service.

The open wireless access network apparatus may further include a subscriber quality management unit configured to be connected to the subscriber movement management unit and set quality of Internet services provided from a plurality of the provider servers to differ from one another.

The wireless AP connection control may provide different quality of Internet services in response to the quality of Internet services that is set differently for each subscriber by the subscriber quality management unit.

When the mobile device changes its location and thereby is connected to the second wireless AP, the IP resource management unit may map an IP allocated to the second wireless AP to identify a provider server connected to the first wireless AP, among a plurality of the provider servers, and connect the mobile device to the identified provider server.

A plurality of the open wireless APs may be allocated a common access region that is designated from among IP resources.

In another general aspect, there is provided an open wireless access network apparatus including: a subscriber Internet protocol (IP) management unit configured to allocate to a mobile device an IP allocated from a first wireless access point (AP) from among a plurality of wireless APs; a subscriber connection control management unit configured to provide a second wireless AP with the IP allocated from the first wireless AP when the mobile device changes from one area in which the mobile device has a signal delivered from the first wireless AP to another area in which the mobile device has a signal delivered from the second wireless AP; and a wireless connection module configured to be connected to a provider server that provides an Internet service through the IP allocated by the subscriber connection control management unit.

The open wireless access network apparatus may further include a service quality measurement unit configured to be connected to the wireless connection module and measure quality of the Internet service provided to the mobile device.

The open wireless access network apparatus may further include a subscriber mobility management unit configured to allow sharing of information about the IP currently allocated to the mobile device by transmitting the information about the IP currently allocated to the mobile device to the outside when the mobile device changes its location.

The subscriber connection control unit may include grade of service, service time, traffic and information about a provider server selected from a plurality of the provider servers with respect to each user of the mobile device.

The allocated IP may correspond to a common access region among IP resources and the first wireless AP and the second wireless AP may be allocated the same IP via the common access region.

In another general aspect, there is provided a connection method using a open network apparatus, the connection method including: setting common access region using some IP resources, and allocating an IP corresponding to the common access region to open wireless access points (APs), each of which provides wireless Internet to a mobile device and a plurality of provider servers, each of provider server providing an Internet service; in response to an Internet service request from the mobile device, allocating an IP to the mobile device based on subscriber information, and allowing the mobile device to be provided with an Internet service from a particular provider server among a plurality of the provider servers; in response to the mobile device moving from an area in which the mobile device has a signal delivered from a first wireless AP among a plurality of the open wireless APs to an area in which the mobile device has a signal delivered from a second wireless AP, allowing the second wireless AP to be provided with an IP allocated to the first wireless AP by enabling the second wireless AP to communicate with the first wireless AP to receive the IP allocated to the mobile device; mapping an IP of the particular provider server corresponding to the IP that is provided to the second wireless AP and thereby allowing the mobile device to identify the IP of the particular provider server that is connected through the first wireless AP; and terminating connection between the first wireless AP and the particular provider server and connecting the second wireless AP and the particular provider server.

The open network apparatus includes grade of service, service time, traffic and information about a provider server selected from a plurality of the provider servers with respect to each user of the mobile device.

The connection method may further include after issuing a request for the Internet service, connecting to the open wireless AP using a media access control (MAC) address of the open wireless AP, and receiving and authenticating a user account.

Other features and aspects may be apparent from the following detailed description, the drawings, and the claims.

Figure 1:
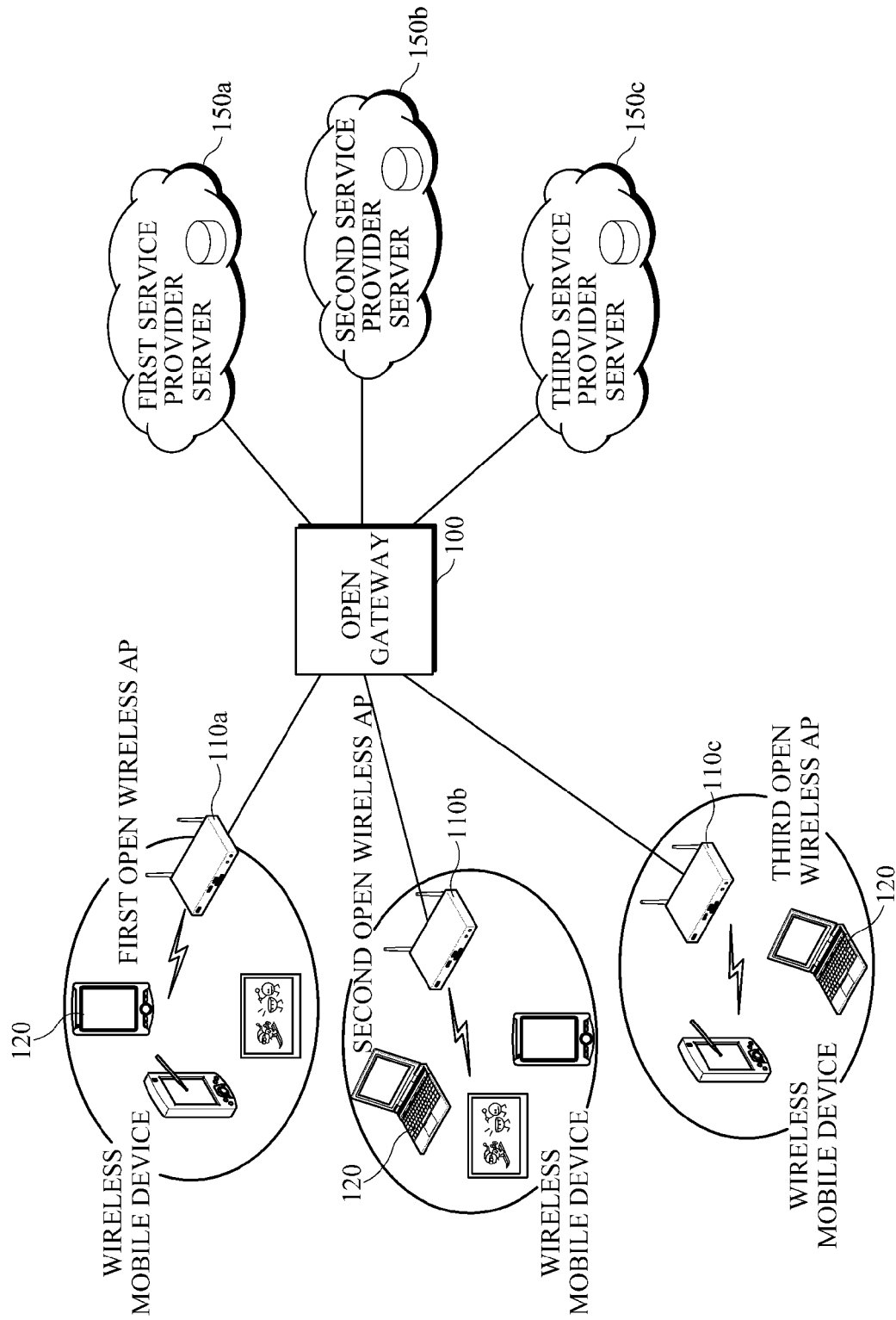
FIG. 1 is a diagram illustrating an example of an open wireless access network system.

Throughout the drawings and the detailed description, unless otherwise described, the same drawing reference numerals will be understood to refer to the same elements, features, and structures. The relative size and depiction of these elements may be exaggerated for clarity, illustration, and convenience.

DETAILED DESCRIPTION

The following description is provided to assist the reader in gaining a comprehensive understanding of the methods, apparatuses, and/or systems described herein. Accordingly, various changes, modifications, and equivalents of the methods, apparatuses, and/or systems described herein will be suggested to those of ordinary skill in the art. Also, descriptions of well-known functions and constructions may be omitted for increased clarity and conciseness.

FIG. 1 illustrates an example of an open wireless access network system.

Referring to FIG. 1, the open wireless access network system may include a plurality of service provider servers 150a, 150b, and 150c, an open gateway 100, open wireless access points (APs) 110a, 110b, and 110c, and a mobile device 120.

A plurality of the provider servers 150a, 150b, and 150c may be connected to the open wireless APs 110a, 110b, and 110c through the open gateway 100 to provide wireless Internet services. In particular, each of the provider servers 150a, 150b, and 150c may be allocated particular Internet protocol (IP) among IPs that are allocated as common access region by the open gateway 100.

The open gateway 100 may allow the provider servers 150a, 150b, and 150c and the mobile device 120 to be connected therewith through IP resource of the common access region. In addition, the open gateway 100 may provide the open wireless APs which are a first wireless AP 110a, a second wireless AP 110b, and a third wireless AP 110c with IP resources allocated as common access region. The mobile device 120 may receive signals from the wireless AP 110a, the second wireless AP 110b, and the third wireless AP 110c. When the mobile device 120 moves from an area where receiving a signal from the first wireless AP 110a to an area where receiving a signal from the second wireless AP 110b or the third wireless AP 110c, the open gateway 100 may provide an IP which is the same as an IP provided to the first wireless AP 110a to the second wireless AP 110b, thereby enabling the first wireless AP 110a and the second wireless AP 110b to share the IP. In addition, the mobile device 120 which moves from one location to another may remain connected to the first provider server 150a through the second wireless AP 110b using the IP that is provided to the first wireless AP 110a. Hence, when the mobile device 120 moves from one place to another, the provider server does not change, and the seamless Internet service thus can be maintained.

The open wireless APs 110a, 110b, and 110c may be allocate IPs by the open gateway 100, and use the allocated IPs to communicate with the mobile device 120. Therefore, the mobile device 120 is allowed to be connected to a particular provider server, e.g., 150a among a plurality of the provider servers 150a, 150b, and 150c by the open gateway 100. Moreover, one open wireless AP (e.g., the first wireless AP 110a) may provide an IP address which is previously allocated to the first provider server 150a and the open wireless AP (e.g., the first wireless AP 110a) to another open wireless AP (e.g., the second wireless AP 110b or the third wireless AP 110c). Accordingly, even when the mobile device 120 moves from one location to another, the latter open wireless AP (e.g., the second wireless AP 110b or the third wireless AP 110c) is able to identify the IP of the open wireless AP (e.g., the first wireless AP 110a) through which the moved mobile device 120 and the provider server are communicating therewith. Hence, the connection between the mobile device 120 and the first provider server 150a is maintained by the particular IP, thereby continuing seamless service.

The mobile device 120 is a device such as a notebook computer, a smart phone, or the like that can be connected to the open wireless APs 110a, 110b, and 110c through a wireless network, for example, Wi-Fi network.

Figure 2:
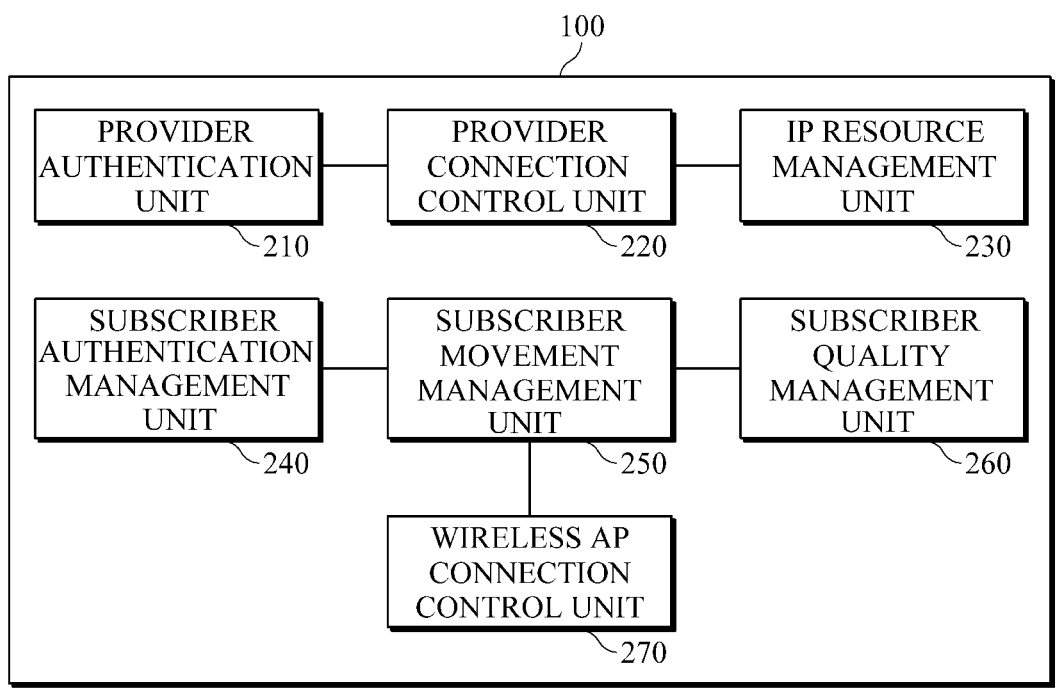
FIG. 2 is a diagram illustrating an example of an open gateway shown in the example illustrated in FIG. 1.

FIG. 2 illustrates an example of the open gateway shown in the example illustrated in FIG. 1.

Referring to FIG. 2, the open gateway 100 may include a provider authentication unit 210, a provider connection control unit 220, an IP resource management unit 230, a subscriber authentication management unit 240, a subscriber movement management unit 250, a subscriber quality management unit 260, and a wireless AP connection control unit 270.

The provider authentication unit 210 may be connected to a plurality of the service providers 150a, 150b, and 150c, and authenticate each provider server 150a, 150b, and 150c.

The provider connection control unit 220 may control the connection of a plurality of the provider servers 150a, 150b, and 150c in an effort for the open gateway 100 to provide an Internet service to a mobile device through the provider servers 150a, 150b, and 150c in response to an activity of the provider authentication unit 210.

The IP resource management unit 230 may allocate an IP to each of a plurality of the provider servers 150a, 150b, and 150c and each of the open wireless APs 110a, 110b, and 110c, and thereby allow the first provider server 150a to communicate with the open wireless APs 110a, 110b, and 110c through the allocated IP. In addition, by using information about the provider server 150a and a subscriber, the IP allocated to the provider server 150a and an IP allocated to the subscriber are mapped. Thus, when the mobile device 120 moves from one location to another, the IP allocated to the mobile device 120 is fixed through the mapping with the IP allocated to the first provider server 150a and the open wireless APs 110a, 110b, and 110c, so that seamless service can be maintained.

In response to a request signal from the subscriber through the mobile device 120 to use the Internet service, the subscriber authentication management unit 240 may perform subscriber authentication for allowing the use of wireless Internet service. The subscriber authentication management unit 240 may include information about subscriber identifier (ID) and password, information about Internet service quality per subscriber, and information on the mobile device 120 in use by the subscriber.

The subscriber movement management unit 250 may enable the wireless AP connection control unit 270 to provide the IP from the first wireless AP 110a to the second wireless AP 110b when the mobile device 120 in use by the subscriber moves from one location to another.

The subscriber quality management unit 260 may set, for example, quality of service (QoS), maximum allowable bandwidth, and service duration time to be different from one subscriber to another in response to the subscriber information stored in the subscriber authentication management unit 240, and thereby the quality of Internet service provided by the service server 150a can differ with the subscriber.

The wireless AP connection control unit 270 may control connection with the open wireless APs 110a, 110b, and 110c. In response to the subscriber authentication management unit 240 authenticating the subscriber, based on information about the authentication, the wireless AP connection control unit 270 may allocate IP to one of the open wireless APs 110a, 110b, and 110c, which corresponds to an IP of the provider server 150a, so that the mobile device 120 can be connected to the provider server 150a through the IP allocated to one of the open wireless APs 110a, 110b, and 110c. In addition, if the open wireless AP to which the mobile device is connected is changed from the first wireless AP 110a to the second wireless AP 110b due to the movement of the mobile device 120, the IP originally allocated to the first wireless AP 110a is transmitted to the second wireless AP 110b, and thus the mobile device 120 is allowed to maintain the connection with the second wireless AP 110b through the same IP as allocated to the first wireless AP 110a. At this time, the wireless AP connection control unit 270 may allow the connection with the open wireless AP 110a, 110b, and 110c in response to the Internet service quality set by the subscriber quality management unit 260, thereby providing Internet service quality that differs with the subscriber.

Figure 3:
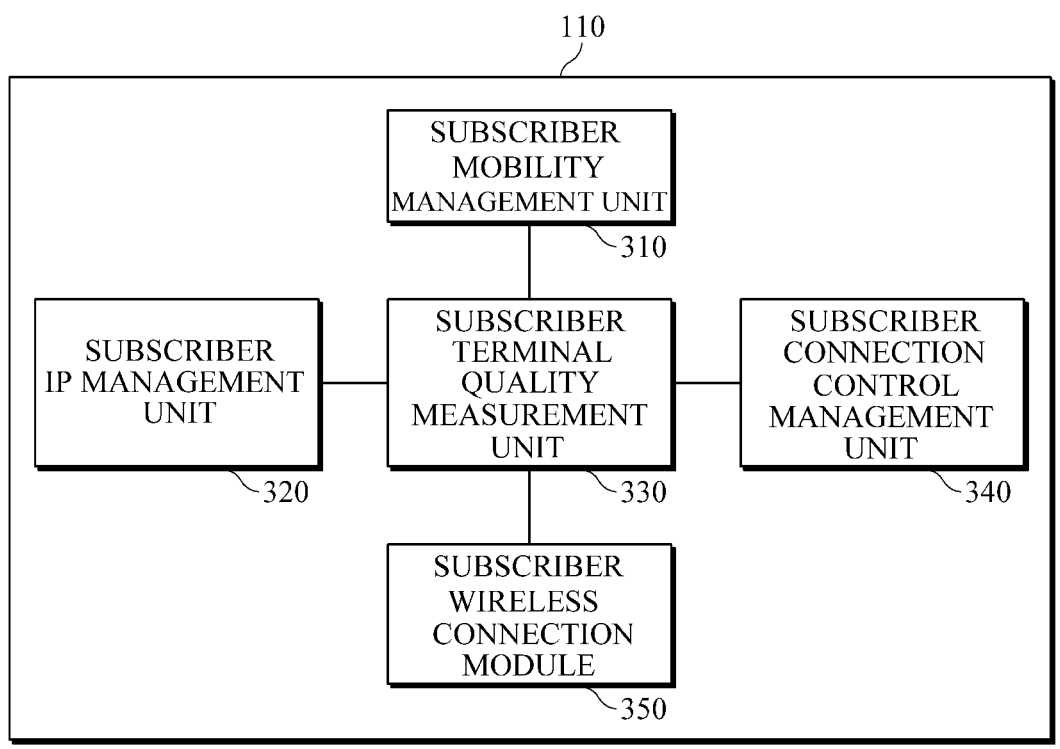
FIG. 3 is a diagram illustrating an example of an open wireless AP shown in the example illustrated in FIG. 1.

FIG. 3 illustrates an example of the open wireless AP shown in the example illustrated in FIG. 1. Referring to FIG. 3, each of the open wireless APs 110a, 110b, and 110c may include a subscriber mobility management unit 310, a subscriber IP management unit 320, a subscriber terminal quality measurement unit 330, a subscriber connection control management unit 340, and a subscriber wireless connection module 350.

The subscriber mobility management unit 310 may allow the first wireless AP 110a to provide an IP to the second wireless AP 110b when the mobile device in use by a subscriber moves from one location to another.

The subscriber IP management unit 320 may allocate to the mobile device in use by the subscriber an IP corresponding to the IP which is allocated to the open wireless AP 110a, 110b, or 110c based on the subscriber information.

The subscriber terminal quality measurement unit 330 may recognize Qos, maximum allowable bandwidth, and service duration time of Internet service, and determine whether an Internet service is being provided to the subscriber from the provider server 150a at the predefined Internet service quality.

In association with the open gateway 100, the subscriber connection control management unit 340 may control the connection of the mobile device 120. The subscriber connection control management unit 340 may prioritize subscribers in an effort to manage the connection between the mobile device 120 and the open wireless APs 110a, 110b, and 110c.

The subscriber wireless connection module 350 may control the connection between the mobile device 120 and the open wireless APs 110a, 110b, and 110c. The subscriber wireless connection module 350 may allow the mobile device 120 to be connected to the provider server through the open wireless APs 110a, 110b, and 110c using the IP allocated to the mobile device 120. When the open wireless AP to which the mobile device 120 is connected is changed from the first wireless AP 110a to the second wireless AP 110b due to the movement of the mobile device 120, the IP allocated to the first wireless AP 110a is transmitted to the second wireless AP 110b, and thus the mobile device 120 is allowed to be connected to the second wireless AP 110b through the same IP as allocated to the first wireless AP 110a. In this case, the wireless AP connection control unit 270 of the open gateway 100 may allow the connection of the open wireless APs 110a, 110b, and 110c in response to the Internet service quality set by the subscriber quality management unit 260, thereby providing Internet service quality that differs with the subscriber.

Figure 4:
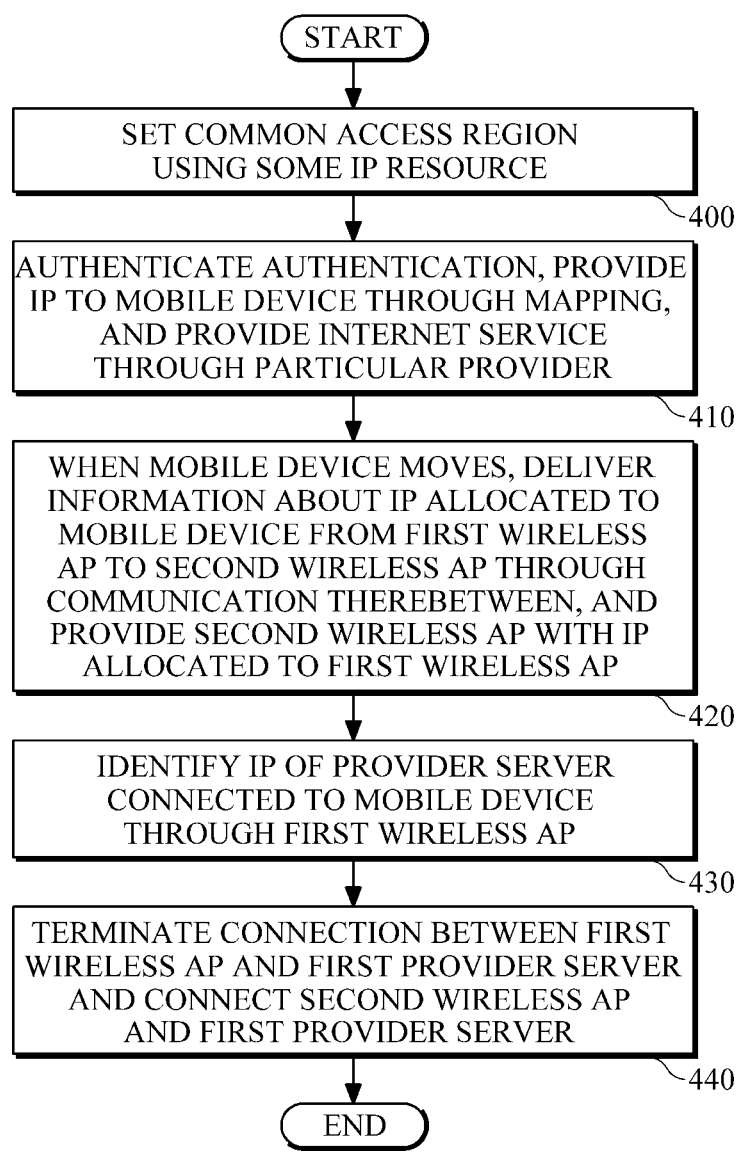
FIG. 4 is a flowchart illustrating an example of operation of an open gateway shown in the example illustrated in FIG. 1.

FIG. 4 illustrates a flowchart of an example of operation of the open gateway shown in the example illustrated in FIG. 1.

Referring to FIGS. 1 and 4, the open gateway 100 may acquire some IP resources and set common access region (400). In addition, the open gateway 100 may allocate IPs to the provider server 150a which provides Internet service and each of the open wireless APs 110a, 110b, and 110c which provide wireless Internet to the mobile device 120.

In response to an Internet service request from the mobile device 120 which is connected to the open gateway 100 through the first wireless AP 110a, the open gateway 100 authenticates the mobile device 120 through the subscriber authentication management unit 240, and allocates an IP to the mobile device 120 by means of mapping, so that the mobile device 120 can be offered with the Internet service by a particular provider among a plurality of service providers (410).

When the mobile device 120 moves from an area where receiving a signal from the first wireless AP 110a to an area where receiving a signal from the second wireless AP 110b, the second wireless AP 110b may communicate with the first wireless AP 110a to receive information about an IP allocated to the mobile device 120. That is, the second wireless AP 110b enables to be provided with an IP allocated to the first wireless AP 110a by the open gateway 100 (420). In addition, the open gateway 100 may map an IP of the provider server 150a to correspond to the IP allocated to the second wireless AP 110b in the IP resource management unit 230. Thus, the mobile device 120 may identify the IP of the provider server 150a connected through the first wireless AP 110a (430). Moreover, the open gateway 100 may terminate the connection between the first wireless AP 110a and the first provider server 150a and connect the second wireless AP 110b and the first provider server 150a, thereby enabling the mobile device 120 to be provided with the Internet service by the first provider server 150a through the second wireless AP 110b (440).

Figure 5:
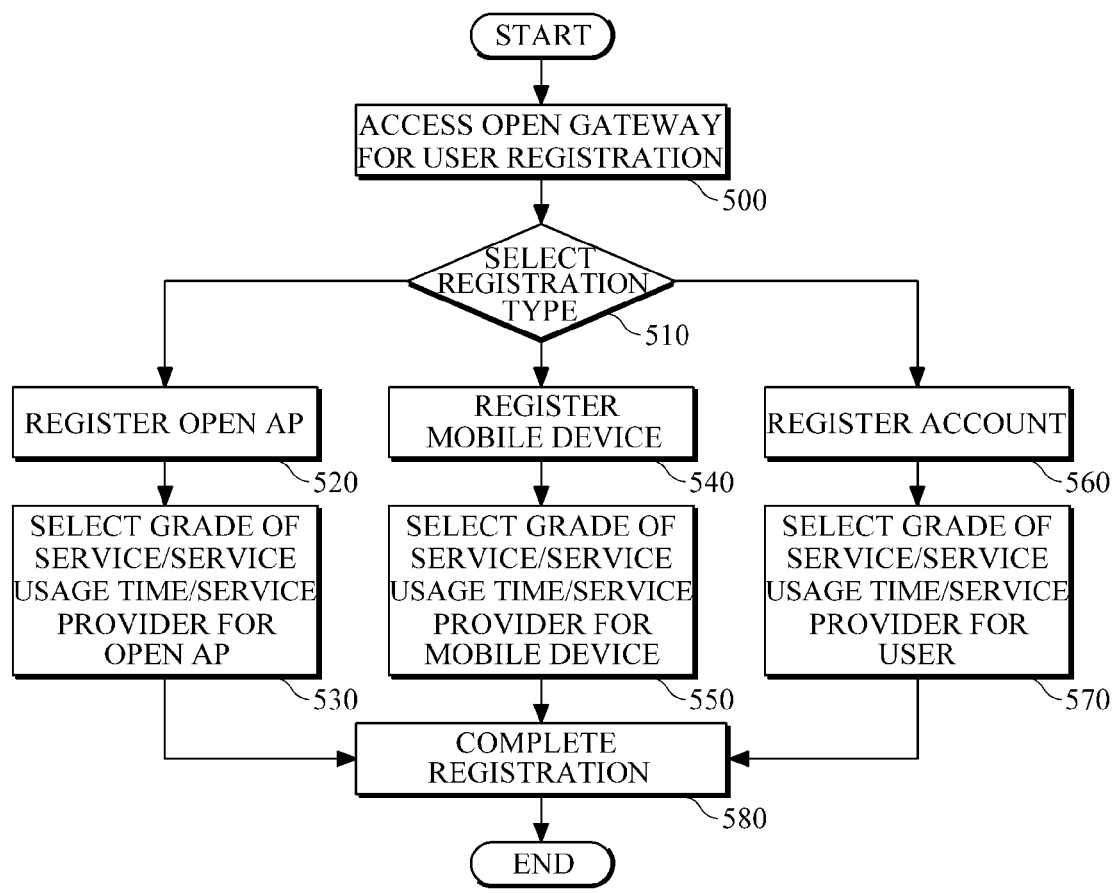
FIG. 5 is a flowchart illustrating an example of a method of registering a user in an open gateway shown in the example illustrated in FIG. 1.

FIG. 5 illustrates a flowchart of an example of a method of registering a user in the open gateway shown in the example illustrated in FIG. 1.

Referring to FIGS. 1 and 5, the provider servers 150a, 150b, and 150c and the mobile device 120 are connected to the open gateway 100 for user registration (500). In this case, because the provider servers 150a, 150b, and 150c and the mobile device 120 can be connected to the open gateway 100 through a unique IP address of common access region assigned to the open gateway 100, they do not need to be connected to an external Internet network. The provider servers 150a, 150b, and 150c and the mobile device 120 may select a registration type after having been connected to the open gateway 100 (510). The registration type may be categorized into open wireless AP registration, mobile device registration, and account registration. For the open wireless AP registration (520), grade, usage time, traffic, and a service provider are selected with respect to data and service to be transmitted and received through the open wireless APs 110a, 110b, and 110c, regardless of a subscriber who is connected to the open wireless APs 110a, 110b, and 110c (530), and thus the registration is completed (580). For the mobile device registration (540), instead of the open wireless APs 110a, 110b, and 110c, based on the mobile device 120 in use by the subscriber who is connected to the open wireless APs 110a, 110b, and 110c, the grade, the usage time, traffic, and the service provider are selected with respect to data and service transmitted and received through the open wireless APs 110a, 110b, and 110c (550), and then the registration is completed (580). For the account registration 560, based on a user's ID, the grade, the usage time, traffic, and the service provider are selected with respect to data and service transmitted and received through the open wireless APs 110a, 110b, and 110c (570), and then the registration is completed (580).

Figure 6:
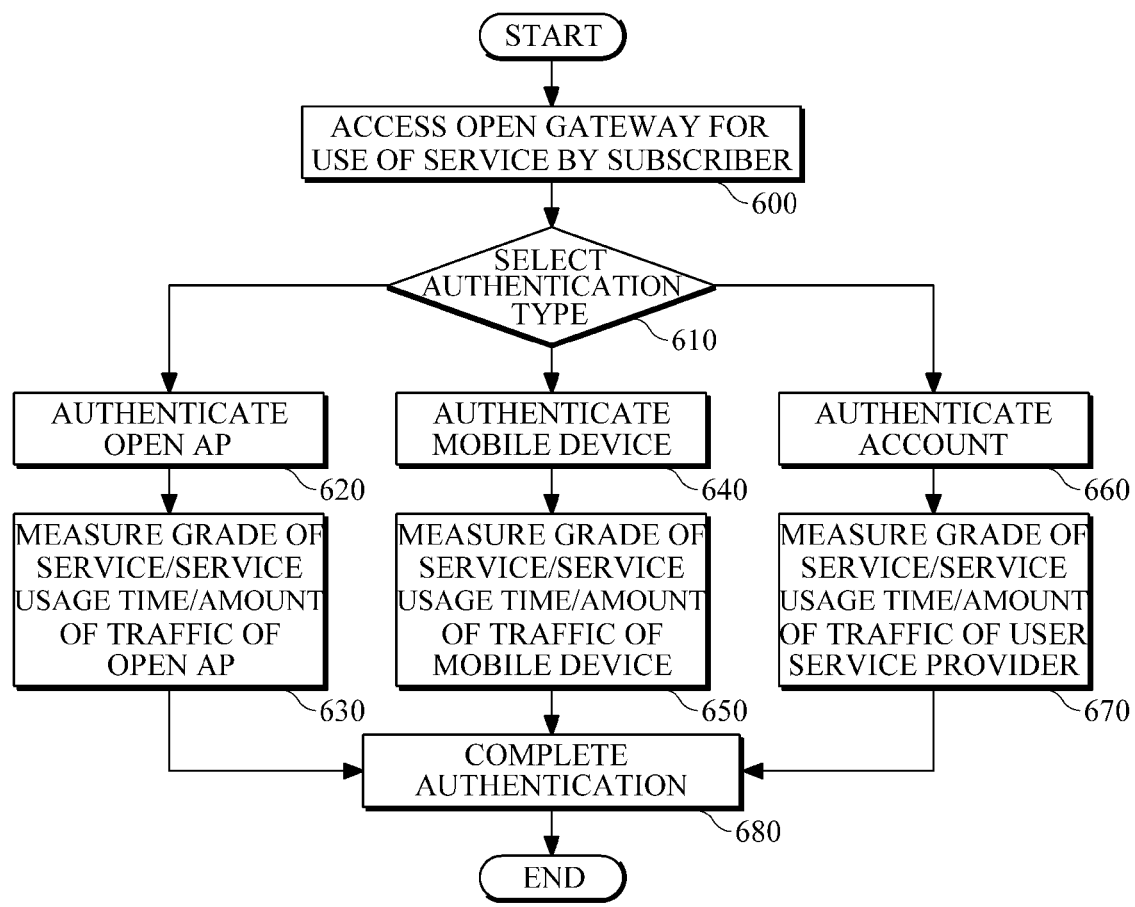
FIG. 6 is a flowchart illustrating an example of a method of authenticating a user in an is open gateway shown in the example illustrated in FIG. 1.

FIG. 6 illustrates a flowchart of an example of a method of authenticating a user in the open gateway shown in the example illustrated in FIG. 1.

Referring to FIGS. 1 and 6, in response to the mobile device 120 entering ON-state, an open wireless AP to which the mobile device 120 is connected at the site is searched and the mobile device 120 is connected to the found open wireless AP (600). Then, an authentication type is selected (610). The authentication type may include open wireless AP connection authentication that proceeds in the open wireless AP, mobile device authentication which is performed by inputting user ID and passwords of the user who is connected through the mobile device 120, and user account authentication which is performed by connecting the mobile device 120 with the open gateway through a unique ID (e.g., media access control (MAC) address, etc) of the mobile device 120 and inputting a user account.

The open wireless AP connection authentication 620 is authentication for a subscriber group that is connected to each open wireless AP 110a, 110b, and 110c, and through this authentication, grade of service, service time, setting values for total traffic, and a desired Internet service provider are designated with respect to the subscribers of the group who are connected to the corresponding open wireless AP 110a, 110b, or 110c (630). Hence, Internet connection data that is received by the open gateway 100 through the corresponding open wireless AP 110a, 110b, or 110c may have previously undergone authentication for a previously designated Internet service provider and IP allocation, or previously allocated IP resources are allocated to the corresponding open wireless AP for Internet connection. In this case, because the mobile device 120 may use the IP allocated by the open wireless AP 110a, 110b, or 110c to which the mobile device 120 is connected and the IP in use by the mobile device 120 needs to be uniquely set for common access, the open gateway 100 may have a private IP address within a range predefined for each open wireless AP 110a, 110b, and 110c. Accordingly, redundant allocation of an IP address can be prevented when the mobile device 120 is moved from one location to another. The open gateway 100 may measure data that is transmitted to and received from the open wireless APs 110a, 110b, and 110c over the Internet, and control the service based on the measurement result.

For the mobile device authentication 640, the service user has previously registered a unique value (MAC address) of the user's terminal, i.e., the mobile device 120, in the open gateway 100, and grade of service and service time, setting values for total traffic and a provider server 150a that provides a desired Internet service are designated with respect to the registered mobile device 120 (650). Accordingly, when the service user (subscriber) is connected to the open gateway 100 through the mobile device 120, authentication for the first provider server 150a that provides a predefined Internet service and the IP allocation process are performed, or previously allocated IP resources are allocated to the open wireless AP, so that the Internet connection of the mobile device 120 can be achieved. In this case, the mobile device 120 connected to the open wireless AP 110a, 110b, or 110c may have a unique private IP address in the common access region. The open gateway 100 may control the priority of data that is transmitted and received through the mobile device 120 and/or measure connection time and traffic of the data to control the measured values according to predefined setting values.

Moreover, for the user account authentication 660, the service user (the mobile device user or a provider server operator) has previously registered the user's account in the open gateway 100, and grade of service and service time, which are designated for each corresponding account, setting values for total traffic and a desired Internet service provider may be designated with respect to a subscriber connected to the open gateway 100 through the registered account (670). Hence, with respect to the mobile device 120 that receives data from the open gateway 100 through the relevant account, authentication for a predefined Internet service provider and IP allocation process are performed, or previously allocated IP resources are allocated to the corresponding open wireless AP 110*a*, 110*b*, or 110*c* to realize Internet connection. The mobile device 120 connected to the open wireless AP 110*a*, 110*b*, or 110*c* may have a unique private IP address in the common access region. The open gateway 100 may control the priority of data that is transmitted and received through the mobile device 120 and/or measure connection time and traffic of the data to control the measured values according to predefined setting values.

A number of examples have been described above. Nevertheless, it should be understood that various modifications may be made. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

What is claimed is:

1. An open wireless access network apparatus comprising:
    an Internet protocol (IP) resource management unit configured to allocate IPs, respectively, to a plurality of provider servers and open wireless access points (APs), and map the IP of each provider server to the IP of each open wireless AP;
    a subscriber movement management unit configured to provide a second wireless AP with an IP that has been allocated to a first wireless AP when a mobile device changes from one area in which the mobile device has a signal delivered from the first wireless AP to another area in which the mobile device has a signal delivered from the second wireless AP; and
    a wireless AP connection control unit configured to allow the mobile device to be connected to the second wireless AP through the allocated IP and, where a quality of Internet services is set to differ for each subscriber, to provide a different quality of Internet services,
    wherein at least one of the IP resource management unit, the subscriber movement management unit, the wireless AP connection control unit is implemented by a processor.

2. The open wireless access network apparatus of claim 1, further comprising:
    a provider authentication unit configured to be connected to the IP resource management unit to authenticate a plurality of the provider servers such that each of the provider servers individually proceeds with authentication.

3. The open wireless access network apparatus of claim 1, further comprising:
    a provider connection control unit configured to be connected to the IP resource management unit to manage connection of each of the provider servers.

4. The open wireless access network apparatus of claim 1, further comprising:
    a subscriber authentication management unit configured to be connected to the subscriber movement management unit and authenticate the subscriber based on information about a subscriber that uses an Internet service.

5. The open wireless access network apparatus of claim 1, further comprising:
    a subscriber quality management unit configured to be connected to the subscriber movement management unit and set the quality of Internet services provided from a plurality of the provider servers to differ from one another.

6. The open wireless access network apparatus of claim 1, wherein when the mobile device changes its location and thereby is connected to the second wireless AP, the IP resource management unit maps an IP allocated to the second wireless AP to identify a provider server connected to the first wireless AP, among a plurality of the provider servers, and connects the mobile device to the identified provider server.

7. The open wireless access network apparatus of claim 1, wherein a plurality of the open wireless APs are allocated a common access region that is designated from among IP resources.

8. An open wireless access network apparatus comprising:
    a subscriber Internet protocol (IP) management unit configured to allocate to a mobile device an IP allocated from a first wireless access point (AP) from among a plurality of wireless APs;
    a subscriber connection control management unit configured to provide a second wireless AP with the IP allocated from the first wireless AP when the mobile device changes from one area in which the mobile device has a signal delivered from the first wireless AP to another area in which the mobile device has a signal delivered from the second wireless AP, and to include grade of service, service time, traffic and information about a provider server selected from a plurality of provider servers with respect to each user of the mobile device; and
    a wireless connection module configured to be connected to a provider server that provides an Internet service through the IP allocated by the subscriber connection control management unit
    wherein at least one of the IP resource management unit, the subscriber movement management unit, the wireless AP connection control unit is implemented by a processor.

9. The open wireless access network apparatus of claim 8, further comprising:
    a service quality measurement unit configured to be connected to the wireless connection module and measure quality of the Internet service provided to the mobile device.

10. The open wireless access network apparatus of claim 8, further comprising:
    a subscriber mobility management unit configured to allow sharing of information about the IP currently allocated to the mobile device by transmitting the information about the IP currently allocated to the mobile device to the outside when the mobile device changes its location.

11. The open wireless access network apparatus of claim 10, wherein the allocated IP corresponds to a common access region among IP resources and the first wireless AP and the second wireless AP are allocated the same IP via the common access region.

12. A connection method using a open network apparatus, the connection method comprising:
    setting common access region using some IP resources, and allocating an IP corresponding to the common access region to open wireless access points (APs), each of which provides wireless Internet to a mobile device and a plurality of provider servers, each of provider server providing an Internet service;
    in response to an Internet service request from the mobile device, allocating an IP to the mobile device based on subscriber information, and allowing the mobile device to be provided with an Internet service from a particular provider server among a plurality of the provider servers;
    in response to the mobile device moving from an area in which the mobile device has a signal delivered from a first wireless AP among a plurality of the open wireless APs to an area in which the mobile device has a signal delivered from a second wireless AP, allowing the second wireless AP to be provided with an IP allocated to the first wireless AP by enabling the second wireless AP to communicate with the first wireless AP to receive the IP allocated to the mobile device;

mapping an IP of the particular provider server corresponding to the IP that is provided to the second wireless AP and thereby allowing the mobile device to identify the IP of the particular provider server that is connected through the first wireless AP; and terminating connection between the first wireless AP and the particular provider server and connecting the second wireless AP and the particular provider server.

13. The connection method of claim 12, wherein the open network apparatus includes grade of service, service time, traffic and information about a provider server selected from a plurality of the provider servers with respect to each user of the mobile device.

14. The connection method of claim 12, further comprising:

after issuing a request for the Internet service, connecting to the open wireless AP using a media access control (MAC) address of the open wireless AP, and receiving and authenticating a user account.

* * * * *